(12) United States Patent
Fattal et al.

(10) Patent No.: US 10,824,881 B2
(45) Date of Patent: Nov. 3, 2020

(54) DEVICE AND METHOD FOR OBJECT RECOGNITION OF AN INPUT IMAGE FOR A VEHICLE

(71) Applicants: Conti Temic microelectronic GmbH, Nuremberg (DE); Continental Teves AG & Co. OHG, Frankfurt am Main (DE)

(72) Inventors: Ann-Katrin Fattal, Frankfurt (DE); Michelle Karg, Lindau (DE); Christian Scharfenberger, Lindau (DE); Stefan Hegemann, Wangen (DE); Stefan Lueke, Rosbach vor der Hoehe (DE); Chen Zhang, Frankfurt am Main (DE)

(73) Assignees: Conti Temic microelectronic GmbH, Nuremberg (DE); Continental Teves AG & Co. OHG, Frankfurt am Main (DE)

( * ) Notice: Subject to any disclaimer, the term of this patent is extended or adjusted under 35 U.S.C. 154(b) by 130 days.

(21) Appl. No.: 16/312,634

(22) PCT Filed: Jun. 20, 2017

(86) PCT No.: PCT/EP2017/065081
§ 371 (c)(1),
(2) Date: Dec. 21, 2018

(87) PCT Pub. No.: WO2017/220573
PCT Pub. Date: Dec. 28, 2017

(65) Prior Publication Data
US 2019/0332873 A1 Oct. 31, 2019

(30) Foreign Application Priority Data

Jun. 23, 2016 (EP) .................................... 16175856

(51) Int. Cl.
*G06K 9/46* (2006.01)
*G06K 9/62* (2006.01)
*G06K 9/00* (2006.01)

(52) U.S. Cl.
CPC ....... *G06K 9/00791* (2013.01); *G06K 9/4642* (2013.01); *G06K 9/6202* (2013.01); *G06K 9/6232* (2013.01)

(58) Field of Classification Search
CPC ................. G06K 9/6212; G06K 9/621; G06K 9/00791–9/00825; G06T 7/10–7/12; G06T 7/194; G06T 2207/20021
See application file for complete search history.

(56) References Cited

U.S. PATENT DOCUMENTS 8,355,571 B2    1/2013  Oh et al.
9,224,066 B2 *  12/2015 Lin ...................... G06K 9/6202
(Continued)

OTHER PUBLICATIONS

International Search Report of the International Searching Authority for International Application PCT/EP2017/065081, dated Sep. 11, 2017, 2 pages, European Patent Office, HV Rijswijk, Netherlands.
(Continued)

*Primary Examiner* — Brian Werner
(74) *Attorney, Agent, or Firm* — W. F. Fasse (57) ABSTRACT

A device for object recognition of an input image includes: a patch selector configured to subdivide the input image into a plurality of zones and to define a plurality of patches for the zones; a voting maps generator configured to generate a set of voting maps for each zone and for each patch, and to binarize the generated set of voting maps; a voting maps combinator configured to combine the binarized set of voting maps; and a supposition generator configured to generate and refine a supposition out of or from the combined, binarized set of voting maps.

9 Claims, 9 Drawing Sheets

(56) References Cited

U.S. PATENT DOCUMENTS

| | | | |
|---|---|---|---|
| 9,576,356 B2* | 2/2017 | Lay | G06K 9/6256 |
| 2015/0227817 A1* | 8/2015 | Lin | G06K 9/6212 |
| | | | 382/170 |
| 2017/0046835 A1* | 2/2017 | Tajbakhsh | G06T 7/73 |
| 2019/0147225 A1* | 5/2019 | Thodberg | G06K 9/00382 |
| | | | 382/226 |

OTHER PUBLICATIONS

PCT Written Opinion of the International Searching Authority for International Application PCT/EP2017/065081, dated Sep. 11, 2017, 11 pages, European Patent Office, HV Rijswijk, Netherlands.

PCT Written Opinion of the International Preliminary Examining Authority for International Application PCT/EP2017/065081, dated Mar. 26, 2018, 8 pages, European Patent Office, HV Rijswijk, Netherlands.

PCT International Preliminary Report on Patentability for International Application PCT/EP2017/065081, dated Jun. 6, 2018, 8 pages, European Patent Office, HV Rijswijk, Netherlands.

Extended European Search Report for European Patent Application No. 16175856.0, dated Jan. 4, 2017, 12 pages, European Patent Office, Munich, Germany.

Bastian Leibe et al., "Combined Object Categorization and Segmentation with an Implicit Shape Model", ECCV'04 Workshop on Statistical Learning in Computer Vision, Prague, May 2004, XP055148590, pp. 1 to 16.

Vijay B. Kumar et al., "A Discriminative Voting Scheme for Object Detection using Hough Forests", Aug. 31, 2010, XP055330616, Retrieved from the Internet: URL:http://www.eecs.qmul.ac.uk/~ioannisp/pubs/ecopies/2010bmvc-KumarPatras.pdf, retrieved on Dec. 20, 2016, pp. 1 to 10.

Ali Borji et al., "Exploiting Local and Global Patch Rarities for Saliency Detection", 2012 IEEE Conference on Computer Vision and Pattern Recognition (CVPR 2012), Jun. 16, 2012, XP032232110, ISBN: 978-1-4673-1226-4, pp. 478 to 485.

Jianming Zhang et al., "Saliency Detection: A Boolean Map Approach", 2013 IEEE International Conference on Computer Vision, Dec. 1, 2013, XP032573002, ISSN: 1550-5499, retrieved on Feb. 28, 2014, pp. 153 to 160.

Min Sun et al., "Depth-Encoded Hough Voting for Joint Object Detection and Shape Recovery", Computer Vision—ECCV 2010, Springer Berlin Heidelberg, Sep. 5, 2010, XP019150658, ISBN: 978-3-642-15554-3, 14 pages.

Maria Sagrebin et al., "Real-Time Moving Object Detection for Video Surveillance", Sixth IEEE International Conference on Advanced Video and Signal Based Surveillance, 2009, (AVSS '09), Piscataway, NJ, USA, Sep. 2, 2009, XP031541929, ISBN: 978-1-4244-4755-8, pp. 31 to 36.

Yisong Chen et al., "Adaptive Figure-Ground Classification", 2012, IEEE Conference on Computer Vision and Pattern Recognition (CVPR 2012), Jun. 16, 2012, XP032232132, ISBN: 978-1-4673-1226-4, pp. 654 to 661.

* cited by examiner

Fig. 10 ize the generated set of voting maps $V^{(m)}$; a voting
DEVICE AND METHOD FOR OBJECT RECOGNITION OF AN INPUT IMAGE FOR A VEHICLE

FIELD OF THE INVENTION

The present invention relates to the field of object recognition. Particularly, the present invention relates to a device and a method for object recognition of an input image for a vehicle.

BACKGROUND OF THE INVENTION

Existing approaches to object detection address the generation of object hypotheses by extracting several cues in natural and automotive images, relying on objects with sufficiently high resolution.

Driver assistance systems are rapidly gaining importance due to an increasing demand for advanced safety and comfort functions in today's vehicles. They monitor the area surrounding a vehicle based on a variety of sensors, including Radar, Lidar, or cameras.

Front-facing systems play a major role in the automotive industry and provide additional safety and comfort functions such as Forward Collision Warning, FCW, Adaptive Cruise Control, ACC, Pedestrian Detection, PED, and Traffic Sign Recognition, TSR, among others.

Here, camera-based systems are of particular interest due to their ability to monitor the entire area in front of a vehicle and extract safety-relevant information in an automatic fashion. Moreover, camera systems can combine a variety of functionalities on one platform and are, hence, highly suitable for a cost-sensitive market.

To increase the use-case and robustness of assistance functions such as ACC or PED beyond today's level, the robust detection of objects is one of the most crucial tasks in the area of camera-based driver assistance.

SUMMARY OF THE INVENTION

There may be a need to improve device and methods for object recognition.

These needs are met by the subject-matter of the independent claims. Further exemplary embodiments are evident from the dependent claims and the following description.

An aspect of the present invention relates to a device for object recognition of an input image for a vehicle, the device comprising: a patch selector, which is configured to subdivide the input image into a plurality of zones $z^{(m)}$ and to define a plurality of patches $p_j^{(m)}$ for the zones $z^{(m)}$; a voting maps generator, which is configured to provide a set of voting maps $V^{(m)}$ for each zone m of the plurality of zones $z^{(m)}$ and for each patch $p_j$ of the plurality of patches $p_j^{(m)}$ and to binarize the generated set of voting maps $V^{(m)}$; a voting maps combinator, which is configured to combine the binarized set of voting maps $V^{(m)}$; and a supposition generator, which is configured to generate a supposition out of or from the combined, binarized set of voting maps $V^{(m)}$ and to perform a refinement of the supposition out of or from the combined, binarized set of voting maps $V^{(m)}$. The device is configured to conduct the method for object recognition.

In other words, the task of object detection or of object recognition may be regarded as to be broken down into two components: 1) hypothesis generation and 2) hypothesis validation.

The present method for object recognition of an input image may be applied to fields of image analysis. For instance, the device and the method may be used for analysis of radar signals or images, or in the field of Magnetic resonance imaging, MRI, or computed tomography imaging CT, infrared-based imaging methods, or ultrasonic imaging methods.

The present method for object recognition of an input image advantageously provides that objects may be recognized up to distances of several hundreds of meters compared to up to 50 m for conventional image analysis and object recognition methods.

The present method for object recognition advantageously allows omitting the requirement of training. Even no training data is needed, thereby implementing the present method for object recognition provides a safe and reliable image analysis.

The present method for object recognition advantageously allows identifying unknown objects on the street, as transported goods, tires or further debris particles.

The present method for object recognition advantageously does not make any model assumptions about the presence of features of distant objects with the aid of target objects are detected and localized. Thus, the used approach is generic, and can be used for the first detection of objects such as cyclists, cars, signs, emergency telephones.

The objective of hypothesis generation is to find candidate locations and regions in images quickly for further processing, including classification of regions as pedestrians, vehicles, or traffic signs. Here, hypothesis generation faces several challenges such as complex environments, different lighting and weather conditions, very small objects and objects being far away from the camera.

Depending on the physical properties of the camera system used, automatic hypothesis generation of small and distant objects may be difficult due to poor contrast images and the very few pixels that those objects occupy in images.

The majority of existing approaches to object detection in literature, however, address hypothesis generation of objects with sufficient resolution only. Here, a variety of approaches make use of symmetry operators that measure the symmetry of patches about a defined axis. Symmetry operators can make use of intensity only, but often evaluate image edges as well in order to increase their robustness to noise.

While hypotheses of near objects can be generated very robustly, low resolution and missing edge information of distant objects may make the generation of hypotheses impractical for driver assistance systems.

The present method for object recognition advantageously provides the introduction of a generic approach to hypothesis generation of small and distant objects for driver assistance based on a voting scheme. The voting scheme is inspired by salient region detection that aims to emphasize regions in natural images that appear visually distinct and attractive when compared to the rest of an arbitrary scene.

Following this concept, the method for object recognition provides to generate hypotheses of small and distant objects since candidate objects usually differ from their environment.

The present method for object recognition advantageously assumes hereby that close objects with high resolution are already detected by other already existing algorithms.

Hence, it is provided to model the environment as a composition of very few, large areas with homogeneous appearance. These areas are computed by using image statistics extracted only from the image information available, without a-priori knowledge about the embedding environment needed.

Regions that cannot be assigned to one of these areas are potential candidate locations and form, hence, hypotheses for further processing.

In contrast to other approaches that attempted to detect distant objects by increasing the resolution of images artificially, the present invention advantageously provides that it can work on original images based on the concept of saliency-guided voting maps for candidate distant region detection.

This advantageously provides that a robust method is available to the variation in the environment such as different scale, lighting, weather and traffic scenarios. Experimental results based on a variety of test data and metrices demonstrate promising performance.

This advantageously provides the use of saliency-inspired voting maps for the purpose of generating hypotheses for small and distant objects.

A further, second aspect of the present invention relates to a method for object recognition of an input image for a vehicle, the method comprising the following steps of:

Subdividing the input image into a plurality of zones $z^{(m)}$ and to define a plurality of patches $p_j^{(m)}$ for the zones $z^{(m)}$;

Providing a set of voting maps $V^{(m)}$ for each zone m of the plurality of zones $z^{(m)}$ and for each patch $p_j$ of the plurality of patches $p_j^{(m)}$ and binarizing the generated set of voting maps $V^{(m)}$;

Combining the binarized set of voting maps $V^{(m)}$; and

Generating a supposition out of or from the combined, binarized set of voting maps $V^{(m)}$ and refining the supposition out of or from the combined, binarized set of voting maps $V^{(m)}$.

According to an exemplary embodiment of the present invention, the patch selector is configured to provide the plurality of patches $p_j^{(m)}$ for the zones $z^{(m)}$ using inner statistics of each patch $p^{(m)}$ to classify a patch as belonging to background or to an object region.

According to an exemplary embodiment of the present invention, the patch selector is configured to model the inner statistics of each patch $p_j^{(m)}$ by a Gaussian distribution P $(p_j^{(m)})$ computed over the intensities I of all pixels within each patch $p_j^{(m)}$.

This advantageously allows that a trade-off or compromise is provided between computational effort and accuracy that can be tuned by adjusting.

According to an exemplary embodiment of the present invention, the patch selector is configured to define the plurality of patches $p_j^{(m)}$ for the zones $z^{(m)}$ with a size of the patches in such a way that objects smaller than the patch are still detected within each zone m. This advantageously allows an improved object recognition performance.

According to an exemplary embodiment of the present invention, the voting maps generator is configured to provide the set of voting maps $V^{(m)}$ comprising a map size corresponding to an image size of the input image. This provides advantageously an improved set of voting maps.

According to an exemplary embodiment of the present invention, the voting maps generator is configured to provide the set of voting maps $V^{(m)}$ by computing a feature descriptor $I_j^{(m)}$ for each patch $p_j^{(m)}$ and a descriptor d(x) for each pixel of the input image. This advantageously allows an improved object recognition performance.

According to an exemplary embodiment of the present invention, the voting maps generator is configured to provide the set of voting maps $V^{(m)}$ by determining the feature descriptor $I_j^{(m)}$ by computing the mean feature vector across all pixels of each patch $p_j^{(m)}$. This advantageously allows providing an improved feature descriptor $I_j^{(m)}$.

According to an exemplary embodiment of the present invention, the voting maps generator is configured to determine which pixels belong to the same background region as the patch $p_j^{(m)}$ by a thresholding on the voting map and pixels with a high similarity in comparison to the whole rest of the pixels are considered as belonging to the same background region as the patch $p_j^{(m)}$. This advantageously allows an improved image analysis. The high similarity may be defined by using a threshold, e.g. a threshold level is defined, and if the similarity of a pixel is higher than the threshold the pixel is considered as belonging to the same background region as the patch $p_j^{(m)}$.

According to an exemplary embodiment of the present invention, the voting maps combinator is configured to identify all pixels that are unvoted to a background patch.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) or an EPROM (Erasable Programmable Read Only Memory).

A computer-readable medium may also be a data communication network, for example the Internet, which allows downloading a program code.

The methods, systems, and devices described herein may be implemented as software in a Digital Signal Processor, DSP, in a micro-controller or in any other side-processor or as a hardware circuit within an application specific integrated circuit, ASIC, CPLD or FPGA.

The present invention can be implemented in digital electronic circuitry or in computer hardware, firmware, software, or in combinations thereof, for instance in available hardware of conventional medical imaging devices or in new hardware dedicated for processing the methods described herein.

BRIEF DESCRIPTION OF THE DRAWINGS

A more complete appreciation of the invention and the attendant advantages thereof will be clearly understood by reference to the following schematic drawings, which are not to scale, wherein.

DETAILED DESCRIPTION OF EMBODIMENTS

The illustration in the drawings is purely schematic and does not intend to provide scaling relations or size information. In different drawings, similar or identical elements are provided with the same reference numerals.

Generally, identical parts, units, entities or steps are provided with the same reference symbols in the description.

The term "patch" as used according to the present invention may refer to a section or a portion of an image, in other words a section or a portion of a two-dimensional data field or structure. A patch may be defined by a shape and a size. According to an exemplary embodiment of the present invention, a patch may have the shape of a square, of a rectangle, of a circle or of a polygon. According to an exemplary embodiment of the present invention, a patch may have a size of a single pixel or of a group of pixels or of the entire image.

The term "voting map" as used according to the present invention may refer to another representation of original data in grey scale, in other words, a grey scale representation of the input image. The grey scale per pixel of the voting map provides evidence on whether this pixel belongs to an object or not. In other words, the value of the voting map of the pixel defines a probability of an object represented by the pixel being located there.

The term "supposition out of or from the combined, binarized set of voting maps" as used according to the present invention may refer to a generation of a merging or of a combination of the binarized set of voting maps.

The term "inner statistics" as used according to the present invention may refer to any type of internal statistics of an image or an image area or of a patch.

By using inner statistics any type of data values of an image or an image area or of a patch may be analyzed using various statistical analysis such as investigating a possible Gaussian distribution of the data values or other possible distributions—that is, one examines how strongly the data values correlate with one of the distributions. The term "inner statistics" as used according to the present invention may refer to the aspect that no external model assumption or the like is applied to investigate the data values from external sources, but only the data values of an image or an image area or of a patch are used and analyzed. In other words, besides the distributions, only internal input is used.

Figure 1:
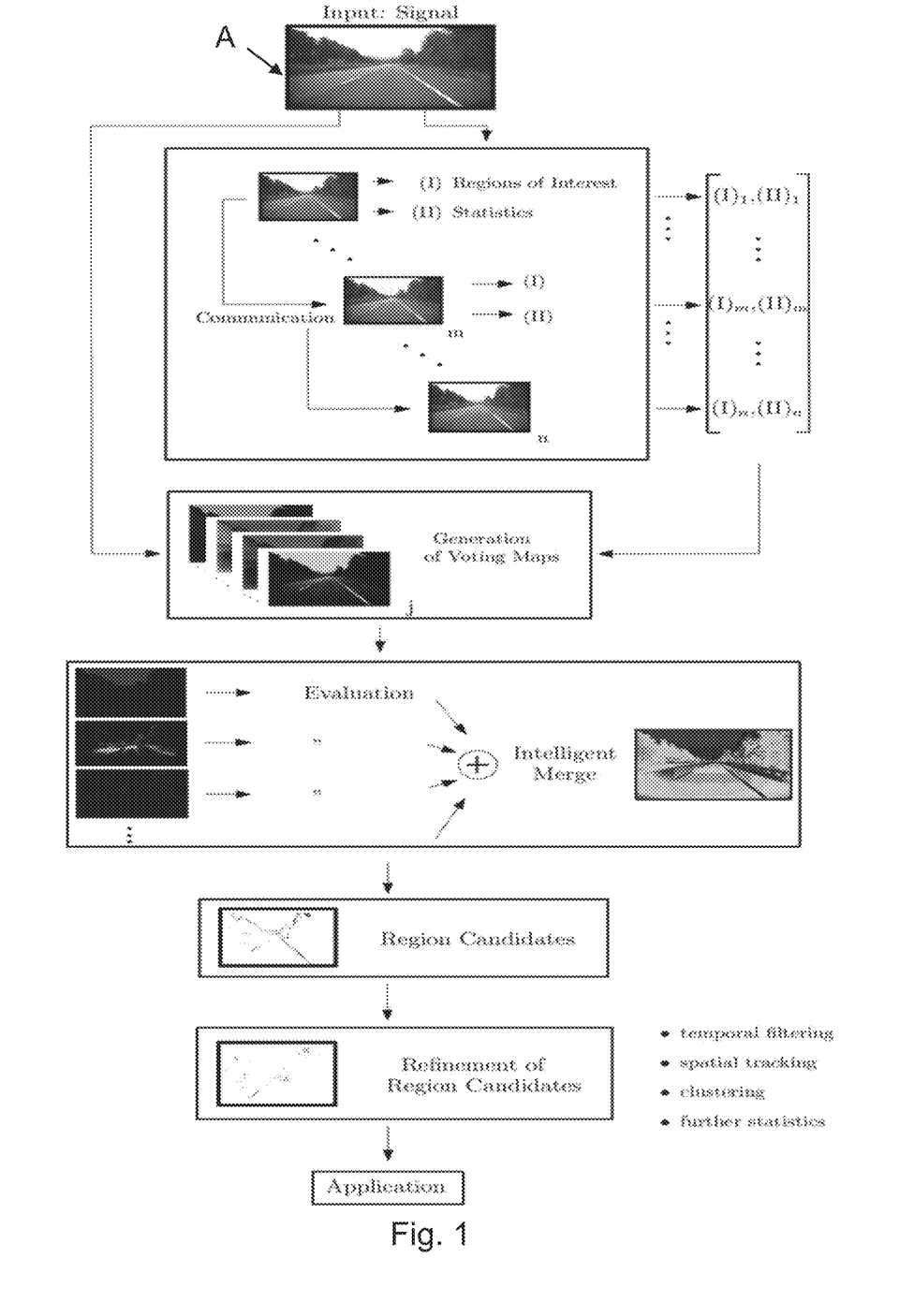
FIG. 1 shows the sketch of a schematic flowchart architecture of the proposed approach according to an exemplary embodiment of the present invention.

FIG. 1 shows the sketch of the flowchart architecture of the proposed approach according to an exemplary embodiment of the present invention.

According to an exemplary embodiment of the present invention, a method is provided for detection and object recognition of even small or distant objects, since they differ in kind from the background.

The term "small" may refer to objects of, for instance, several cm, for instance 15 cm or 25 cm, with a distance to the camera of about several m, for instance, 50 m or up to 100 m or up 250 m or up to 500 m.

According to an exemplary embodiment of the present invention, the method for object recognition is based on the human visual system and may be further based on at least one statistic applied to the whole image to draw conclusions about potential small or distant objects.

In addition to the global statistics, the method may produce local statistics that may be combined with the global statistics and thereby provide conclusions about potential objects close in the distance.

In order to generate the statistics, image feature extraction methods are used, which can be automatically selected based on current situations such as traffic and light and these methods can also be used in parallel and then adaptively weighted.

FIG. 1 shows the schematic flowchart diagram used for the device and the method for object recognition of an input image for a vehicle. The diagram shows how the generic hypothesis generation is performed according to an exemplary embodiment of the present invention.

Human drivers can easily classify regions as belonging to road users or background due to a number of attributes such as color, intensity, size, and granularity among others. This makes road users appear more salient when compared to the rest of the scene or background.

Here, we want to make explicit use of this property and take advantage of inherent characteristics in natural images for generating hypotheses of small and distant objects for driver assistance in an efficient manner.

According to an exemplary embodiment of the present invention, as shown in FIG. 1, the overall architecture of the proposed approach can be broken down into four main stages: (i) patch selection in image zones, (ii) generation of voting maps, (iii) combination of voting maps, and (iv) retrieval of hypotheses.

A detailed description of each stage is provided in the following sections.

According to an exemplary embodiment of the present invention, patch selection in image zones of the input image A is performed. We now wish to define a model to represent the different characteristics of the image's background in a global manner.

Here, we model the environment as being composed of a few regions with homogeneous appearance, where each region is described by a set of patches p representing its global characteristics. As such, the extraction of such patches is the first step towards modeling the overall characteristics of a natural image.

According to an exemplary embodiment of the present invention, moreover, the method defines that the appearance of road users depends on their distance to the camera, and hence, to their position in images. More specifically, for general road scenes, the assumption is made that the appearance of objects changes from the outside of an image to the image center.

Thus, the input image A is subdivided into different zones $z^{(m)}$ with $m \in [1 \ldots n]$; $n \in N$ first.

According to an exemplary embodiment of the present invention, the method considers the environment as being composed of regions with homogeneous appearance as opposed to regions containing small or distant objects, with using the inner statistics of each patch $p_j^{(m)}$ to classify a patch as belonging to background or to an object region. According to a further step, the method models the inner statistics of each patch $p_j^{(m)}$ by a Gaussian distribution $P(p_j^{(m)})$ computed over the intensities I of all pixels x within $p_j^{(m)}$.

According to an exemplary embodiment of the present invention, given the definition of homogeneity, it can be assumed that the Gaussian distribution within a homogeneous patch $p_h$ can be modeled using low variances sigma $\sigma$ $(p_j^{(m)})$, while in-homogeneous patches comprise a wide distribution, resulting in large values of $\sigma(p_j^{(m)})$.

Hence, the standard deviation $\sigma_j^{(m)}$ is chosen as the parameter to dismiss in-homogeneous patches and to produce a set of homogeneous patches $H^{(m)}$ for further processing as follows:

$$H^{(m)} = \{p_j^{(m)} | p_j^{(m)}(\sigma(p_j^{(m)}) \leq \sigma_T^{(m)})\} \tag{1}$$

For environments with homogeneous background content, the assumption can be made that the distribution $P(\sigma(p_j^{(m)}))$ computed across all standard deviations of $p_j^{(m)}$ in $z^{(m)}$ is Gaussian.

$\sigma_T^{(m)}$ is then the apex of the Gaussian distribution, classifying the patches as homogeneous or inhomogeneous.

According to an exemplary embodiment of the present invention, to ensure that only background patches are included in $H^{(m)}$, the patch size has to be large enough to ensure that no area on a large object is considered as background due to its homogeneity.

Otherwise a patch may be placed inside an object. Hence, the size of the patches $w_p \times h_p$ is chosen in such a way that objects smaller than the patch are still detected within each zone. Internal experiments showed that the smallest patch contains ideally at least 100 pixels to ensure statistical examination.

According to an exemplary embodiment of the present invention, a generation of voting maps is performed.

Each homogeneous patch $p_j^{(m)} \in H$ is belonging to a non-object region according to our model. Hence, it is possible to generate a set of voting maps $V^{(m)}$ for each zone m, $$V^{(m)} = \{V_j^{(m)} | j \in [1, \ldots, N]\} \tag{2}$$

for each $p_j^{(m)}$. The voting maps $V^{(m)}$ have the size of an input image A, and the value $V_j^{(m)}(x)$ of each pixel x represents the pixel's similarity as to belonging to background patches.

According to an exemplary embodiment of the present invention, to determine $V_j^{(m)}$, we compute a feature descriptor $I_j^{(m)}$ for each patch $p_j^{(m)} \in H$ and a descriptor $d(x)$ for each pixel in A. The voting map can be computed as:

$$V_j^{(m)}(x) = \|I_j^{(m)} - d(x)\| \tag{3}$$

Figure 4:
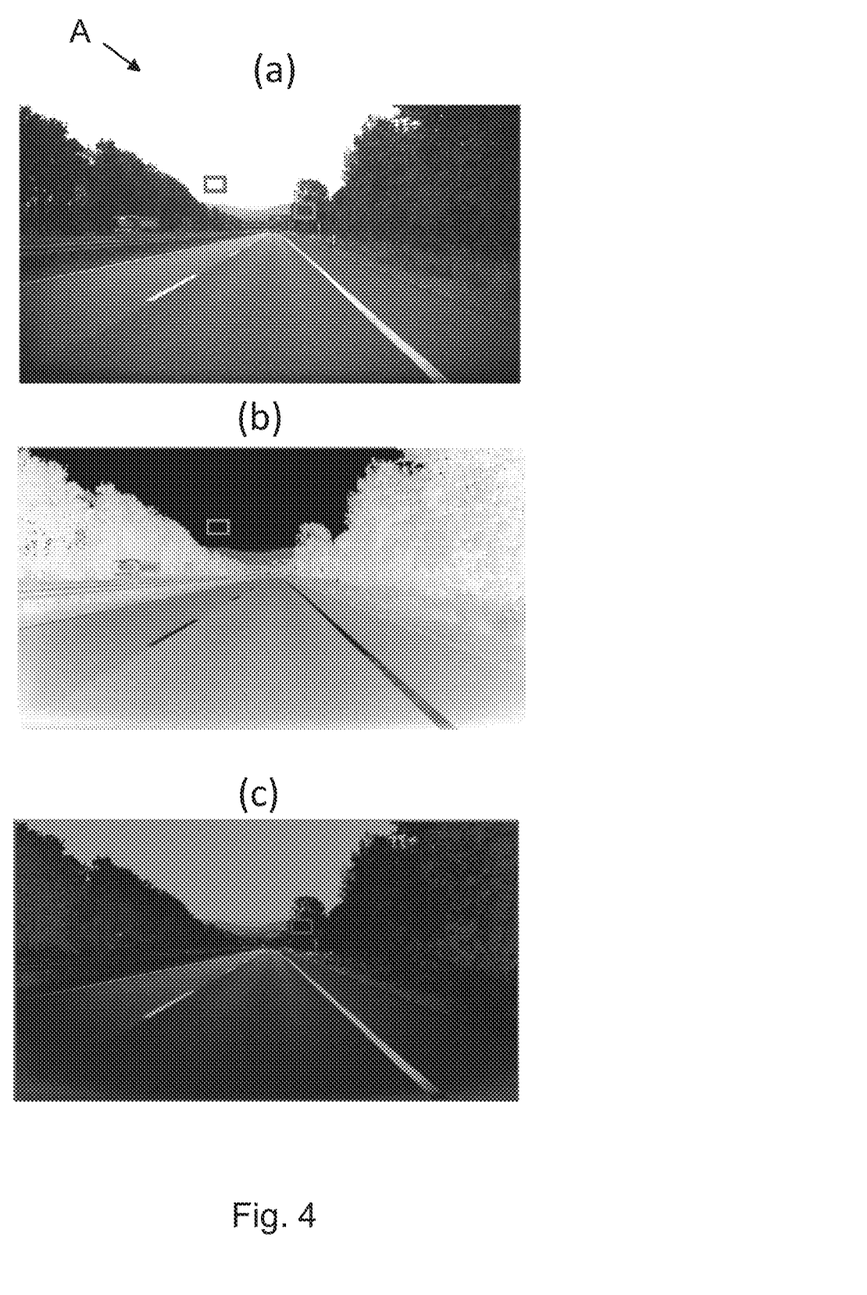
FIG. 4 shows in an example input image the position of two homogeneous patches in the sky according to an exemplary embodiment of the present invention.

In the proposed method, we use the intensity values of the LAB color space as features, and determine $I_j^{(m)}$ by computing the mean feature vector across all pixels of a patch $p_j^{(m)}$. $V_j^{(m)}$ is the voting map corresponding to patch $p_j^{(m)} \in H^{(m)}$. FIG. 4 shows two example voting maps.

According to an exemplary embodiment of the present invention, to determine which pixels belong to the same background region as the patch, a thresholding on the voting map takes place. During thresholding, pixels with a high similarity in comparison to the whole rest of the pixels are considered as belonging to the same background region as the patch.

$$BV_j^{(m)}(x) = \begin{cases} 1 & \text{if } V_j^{(m)}(x) \geq T_{a,j} \\ 0 & \text{if } V_j^{(m)}(x) < T_{a,j} \end{cases}$$

where $BV_j^{(m)}$ is the binarized voting map computed for a patch $p_j^{(m)} \in H^{(m)}$, and $T_{a,j}$ an adaptive threshold value computed as follows:

$$T_{a,j} = \rho \cdot Dyn(V_j^{(m)}) \tag{4}$$

According to an exemplary embodiment of the present invention a closer analysis of the voting maps $V_j^{(m)}$ showed that the distribution of similarity values follows a Gaussian mixture model. As such, the operator $Dyn(\bullet)$ is given through a thresholding method on $V_j^{(m)}$ with $\rho=0.2$ being a control parameter. An example for a threshold method is Otsu's method.

According to an exemplary embodiment of the present invention finally, each binarized voting map $BV_j^{(m)}$ contains pixels belonging to environment $BV_j^{(m)}(x)=0$ or regions $BV_j^{(m)}(x)=1$ forming potential candidate objects.

According to an exemplary embodiment of the present invention, a combination of voting maps is performed. By combining now all binarized voting maps, it is possible to obtain only those pixels which belong to object regions.

According to an exemplary embodiment of the present invention, all pixels, which are not voted to any background patch, are identified. Thus, all binarized voting maps are combined according to which zone m the corresponding patch did belong.

According to an exemplary embodiment of the present invention, the final voting map $V_j^{(m)}$ for zone m is a weighted combination of the binarized map $BV_j^{(m)}$ and the adjacent binarized map $BV_j^{(m+1)}$.

According to an exemplary embodiment of the present invention, the combination of different zones is introduced since the edges between different zones are difficult to model due to different patch sizes within different zones:

$$V^{(m)} = \Sigma_j r \cdot BV_j^{(m)} + (1-r) \cdot BV_j^{(m+1)} \tag{5}$$

$\nabla x \in Z^{(m)}$ and a factor $r \in [0,1]$, we then may compute the final voting map $V_f$ by accumulating the individual and binarized voting maps $V^{(m)}$ as follows:

$$V_f = \Sigma_{m=1}^n V^{(m)} \tag{6}$$

According to an exemplary embodiment of the present invention, the following implementation details may be used:

Zones (rectangular) n=3; Patch Sizes 14-29×10-20 pixels $\rho=0.2$; r=0.66; $dev_c=0.1$.

Experimental evaluations show best performance for the above reported parameters:

According to an exemplary embodiment of the present invention, a generation of hypotheses may be performed.

After accumulating all binarized voting maps, there may be pixels left in the final voting map that have not been assigned to the surrounding environment.

According to an exemplary embodiment of the present invention, these pixels may belong to the regions of potential candidate objects and thus form the regions for generating hypotheses.

According to an exemplary embodiment of the present invention, in order to extract relevant regions for hypothesis generation, we first cluster the pixels according to their location in images using clustering approach.

According to an exemplary embodiment of the present invention, after clustering, a refinement stage is implemented to avoid generating single hypotheses containing multiple close-by candidate object regions or noise, with assuming a different appearance and, hence, different features of different but close candidate objects.

According to an exemplary embodiment of the present invention, thus, the deviation of all features $I_c$ within one cluster to its mean value $\bar{I}_c$ should not exceed a certain value $dev_c$ computed by $$dev_C = \left| 1 - \frac{I_c}{\bar{I}_c} \right| \quad (7)$$

According to an exemplary embodiment of the present invention, if several object regions form one cluster, it is iteratively sub-clustered with a k-means clustering scheme on all features, followed by re-clustering to avoid mini-clusters.

Since we expect only objects with a certain size, clusters which do not show good compactness are dismissed. The compactness criterion includes the elongation in x- and y-direction of the cluster as well as the total size in square pixels.

According to an exemplary embodiment of the present invention, a cluster is dismissed if it contains more than 300 pixels or if it is spread in x- or y-direction by more than 150 pixels.

Figure 2:
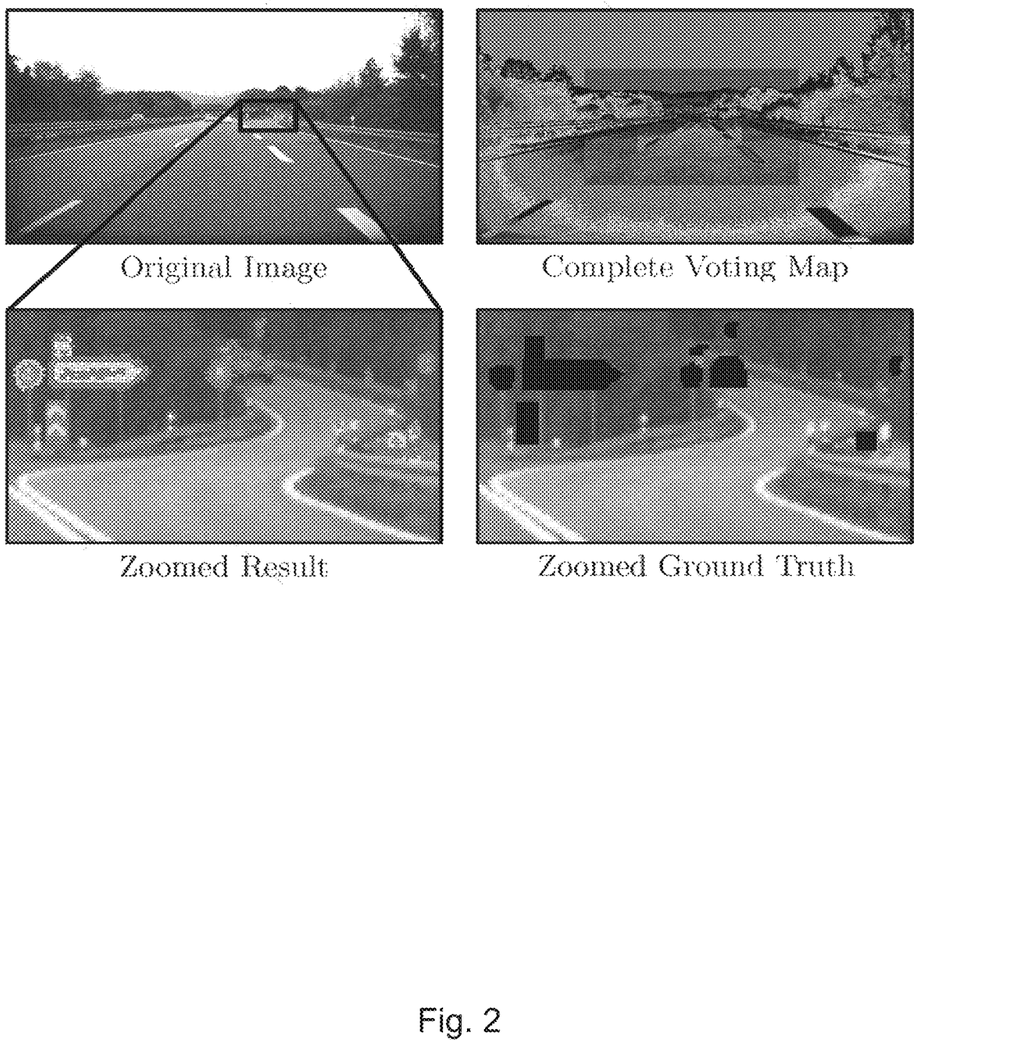
FIG. 2 shows the proposed approach to generic hypothesis generation according to an exemplary embodiment of the present invention.

FIG. 2 shows the proposed approach to generic hypothesis generation according to an exemplary embodiment of the present invention.

In particular, FIG. 2 shows on top: an original image or input image A and final or complete voting map. On the bottom is shown: Hypotheses of distant candidate objects and ground-truth.

Figure 3:
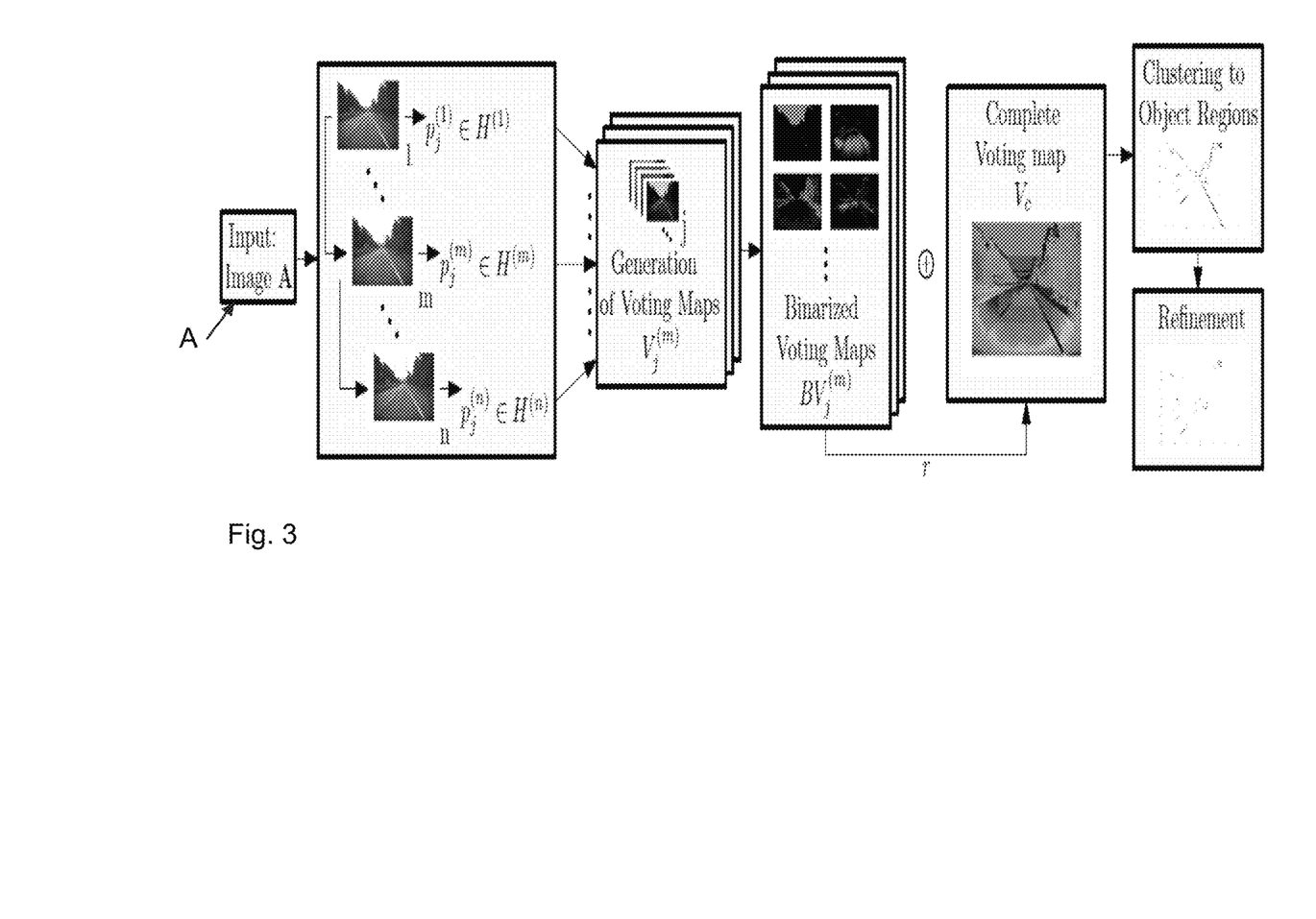
FIG. 3 shows another sketch of the schematic flowchart architecture of the proposed approach according to an exemplary embodiment of the present invention.

FIG. 3 shows the sketch of the flowchart architecture of the proposed approach according to an exemplary embodiment of the present invention.

FIG. 4 shows the position of two homogeneous patches in the sky, grey box on the left of the image, and in the trees, grey box on the right, is shown in the original image (a). The voting maps are computed for the patch shown on the left in (b) and for the patch shown on the right in (c).

Figure 5:
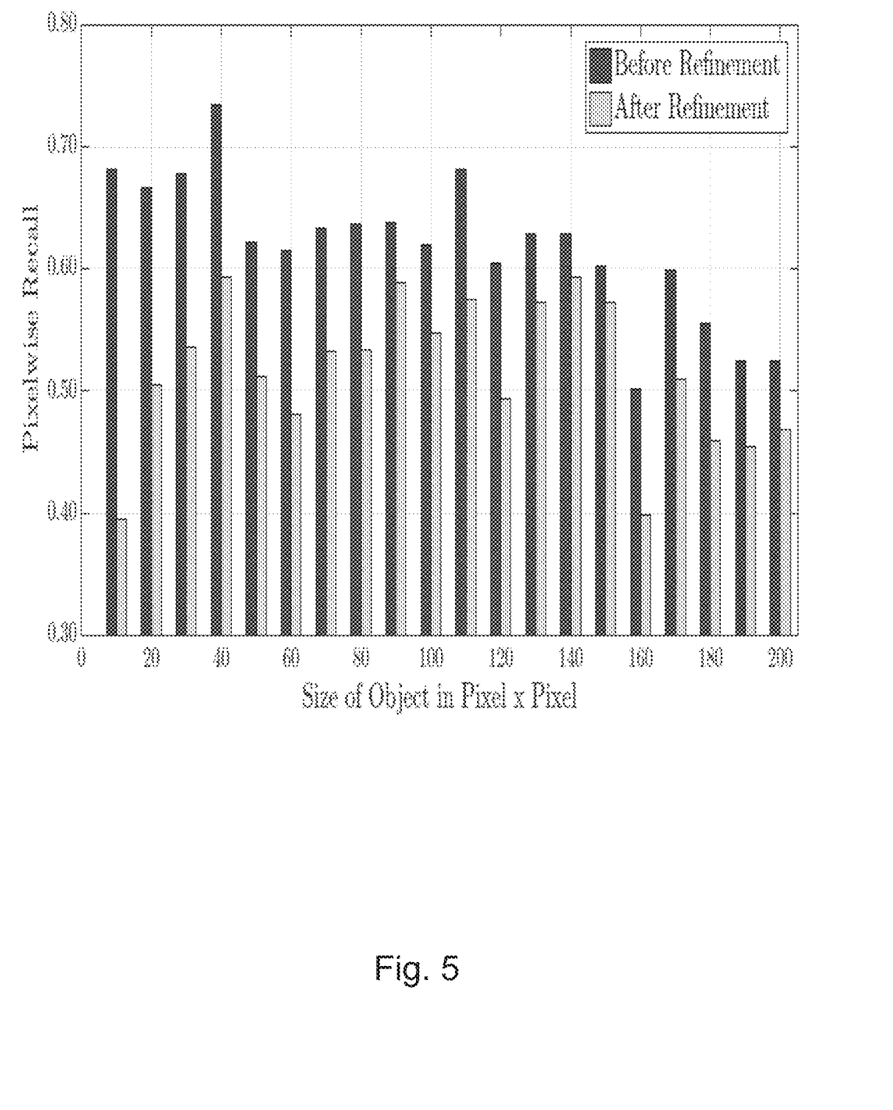
FIG. 5 shows the results for pixel-wise recall before, dark grey, and after refinement, light grey, according to an exemplary embodiment of the present invention.

FIG. 5 shows experimental results according to an exemplary embodiment of the present invention.

The approach is evaluated on a motorway traffic dataset. It is of interest whether all vehicles and objects in the distance are included in the final object hypotheses. This is evaluated by a set of metrics and by a qualitative analysis of the objects in the detected regions.

The following dataset and labeling was used. For evaluation of the approach, a dataset of 80 different motorway scenes was recorded. Two images are selected from each scene that include distant vehicles.

Figure 8:
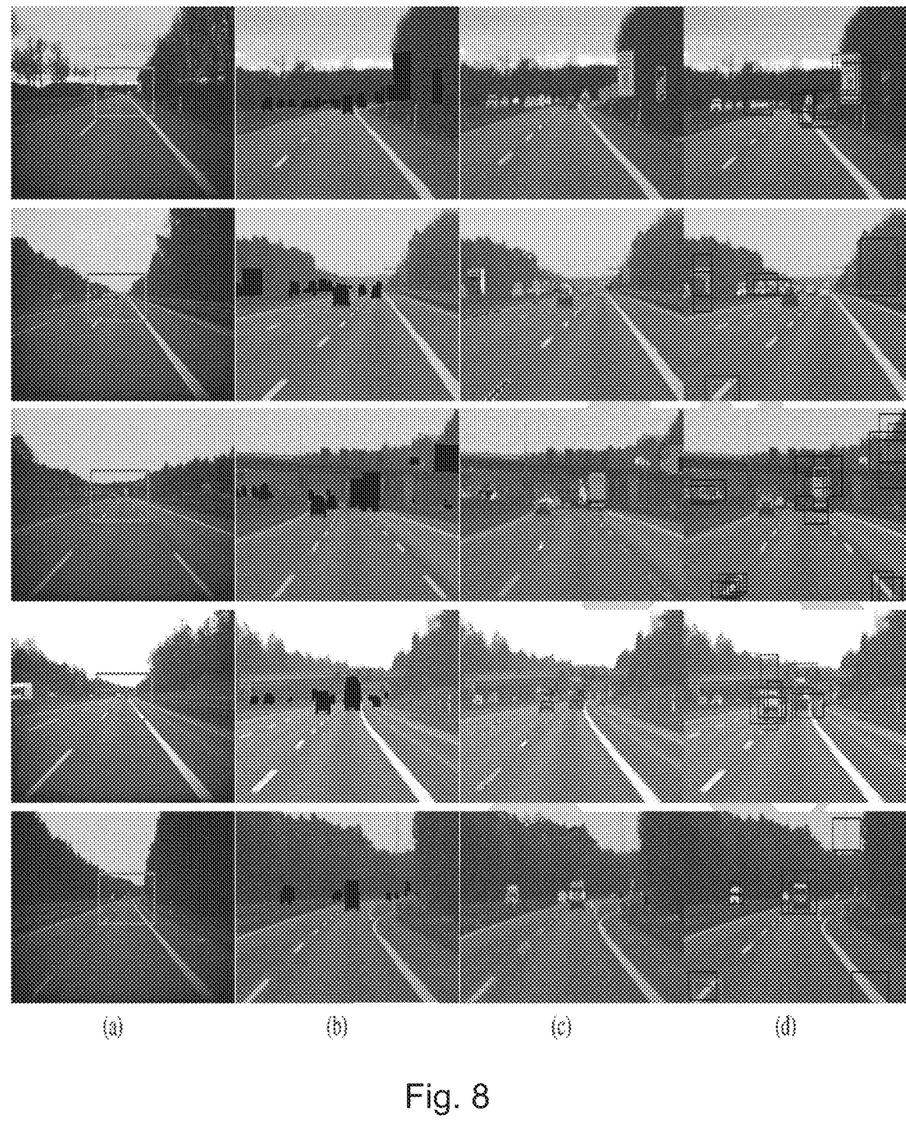
FIG. 8 shows the average recall, precision and F-measure values over all object sizes for the objectiveness measure according to an exemplary embodiment of the present invention.

FIG. 8 shows several examples of the dataset. The size of the images is 640×1176 pixels. All relevant objects are labeled pixel-wise as object regions of interest in each scene, see FIG. 8 (b).

Hereby, only traffic signs which point against the direction of movement are considered as an object region. Likewise objects which are covered by another object by at least 70% are considered as a single combined object region.

FIG. 5 shows pixel-wise recall before (dark grey) and after refinement (light grey) according to an exemplary embodiment of the present invention. On average the object regions are covered by 61.9% before refinement and 51.6% after refinement.

Figure 6:
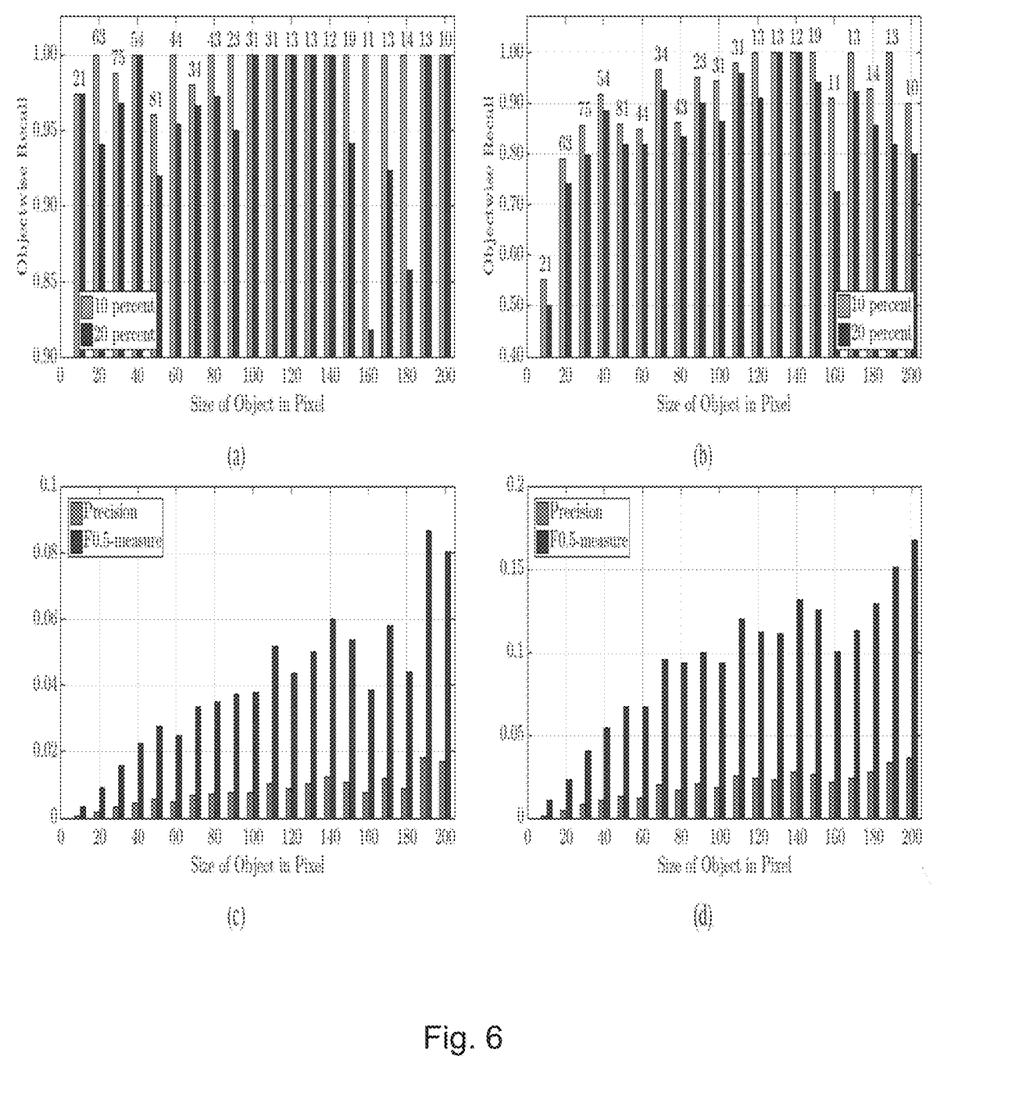
FIG. 6 shows the recall of object regions which are covered by at least certain levels according to an exemplary embodiment of the present invention.

FIG. 6 shows in (a) the recall of object regions which are covered by at least 10% (light grey) and 20% (grey) of records before refinement is displayed. (b) shows the same measurements as in (a) after refinement. In (c) in FIG. 6, the pixel-wise precision values (light grey) and F-measure values (dark grey) before refinement are shown. In (d) the same values as in (c) but after the refinement stage are shown. The number on top of the bars in (a) and (b) displays the amount of objects within the dataset for each object size.

Figure 7:
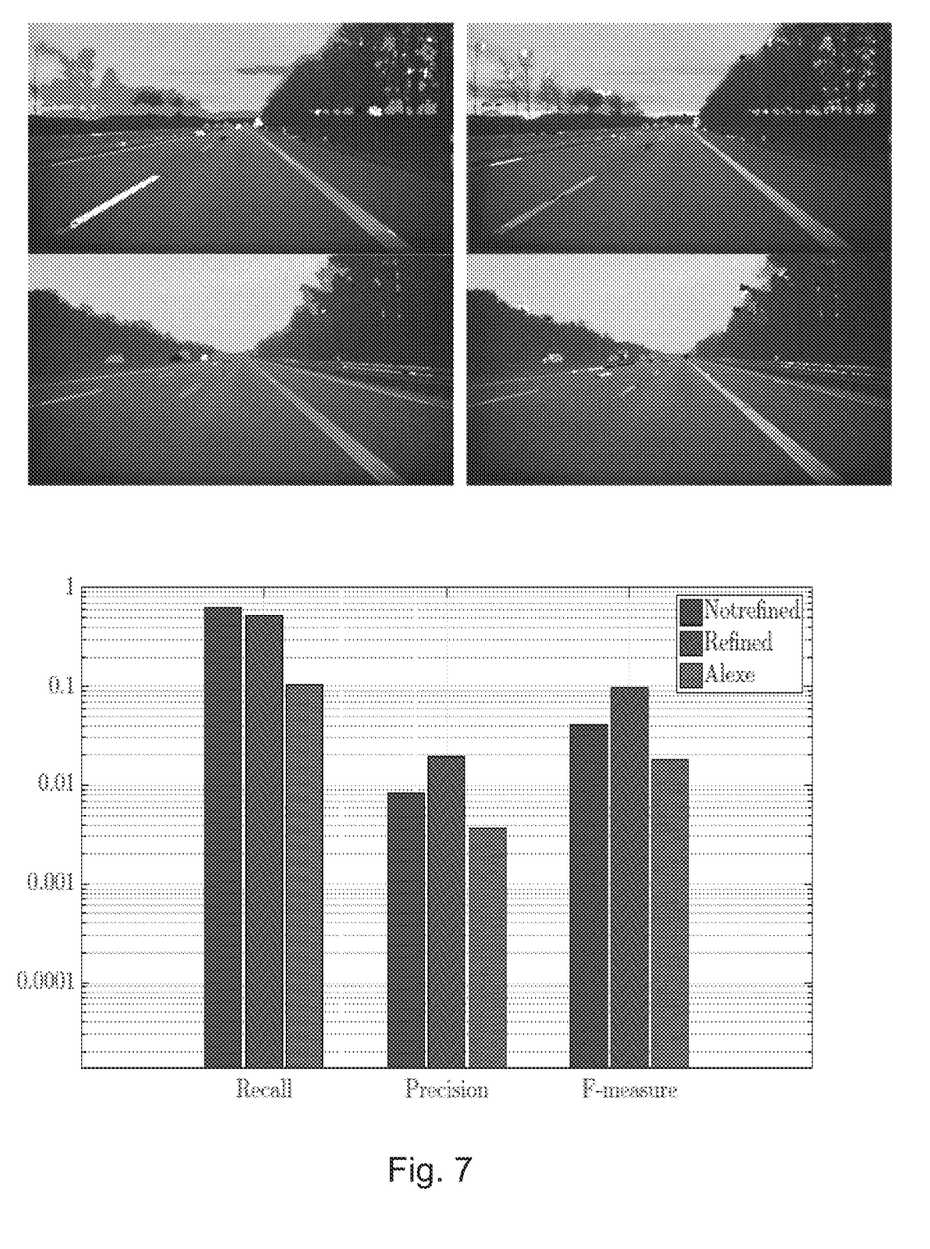
FIG. 7 shows two scenes before and after refinement according to an exemplary embodiment of the present patent application.

FIG. 7 shows in the upper half two scenes before (a) and after (b) refinement. Many false positives records of transition pixels and in trees are identified and dismissed during the refinement stage.

FIG. 7 shows in the lower half results describing the average recall, precision and F-measure values over all object sizes are shown for the objectiveness measure and the present method for object recognition.

The values are displayed in logarithmic scale to be able to compare recall, precision and F-measure values within one plot. It can be seen that our approach outperforms the approach to hypothesis generation on all metrices chosen.

FIG. 8 shows the original image or the input image in (a). The green rectangle illustrates the zoomed region in (b)-(d). The zoomed versions are 293×159 pixels and show distant objects. In (b) the zoomed ground truth data is shown. (c) shows the present method for object recognition after refinement and (d) the objectiveness measure where the red rectangle gives the most probable object within the image.

FIG. 8 shows quality of the present method for object recognition in comparison to another known method.

In FIG. 8, (d) shows the performance on distant object candidates. The images given to the objectiveness algorithm are cropped to the size of 293×159 pixels and only the first 70 object boxes with the size of maximal 50×50 pixels are shown, see (d) of FIG. 8.

The objectiveness cues are well-designed for large objects; yet small objects in the distance are more difficult to be detected by the same cues. The multi-scale saliency cannot be applied on whole motorway scenes since the color distribution within such scenes is too wide to obtain relevant results.

Since distant objects occupy few pixels on the image, the edges density criteria as well as superpixel straddling cannot give significant evidence for an object hypothesis. For distant objects, local or semi-local indicators are more suitable.

To compare the known bounding box algorithm with our proposed pixel-wise method, all pixels within a bounding box are counted as a record. Those records are then evaluated as described.

FIG. 7 shows an example of the average pixel-wise recall, precision and F-measure values over all object sizes smaller than 200 px for the objectiveness-measure and the present method for object recognition before/after refinement.

It shows that the present method for object recognition scores significantly better in recall values while the precision and F-measure values are roughly within the same range.

Hence, the present method for object recognition can be used to increase the detection rate of object regions for small object candidates.

Figure 9:
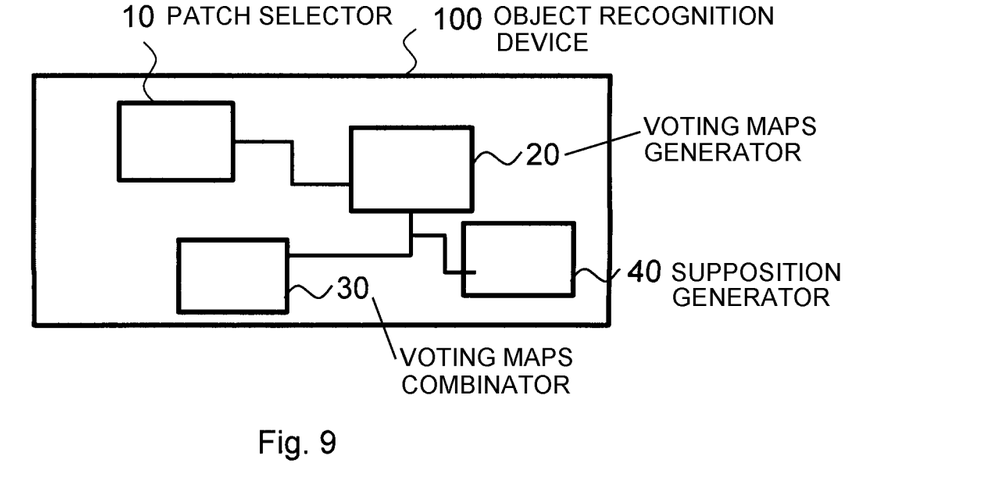
FIG. 9 shows a schematic diagram of the device for object recognition according to an exemplary embodiment of the present invention.

FIG. 9 shows a schematic diagram of the device for object recognition according to an exemplary embodiment of the present invention.

The device 100 may comprise a patch selector 10, a voting maps generator 20, a voting maps combinator 30, and a supposition generator 40.

The patch selector 10 is configured to subdivide the input image A into a plurality of zones $z^{(m)}$ and to define a plurality of patches $p_j^{(m)}$ for the zones $z^{(m)}$. The voting maps generator 20 is configured to provide a set of voting maps $V^{(m)}$ for each zone m of the plurality of zones $z^{(m)}$ and for each patch $p_j$ of the plurality of patches $p_j^{(m)}$ and to binarize the generated set of voting maps $V^{(m)}$.

The voting maps combinator 30 is configured to combine the binarized set of voting maps $V^{(m)}$.

The supposition generator 40 is configured to generate a supposition out of or from the combined, binarized set of voting maps $V^{(m)}$ and to perform a refinement of the supposition out of or from the combined, binarized set of voting maps $V^{(m)}$.

Figure 10:
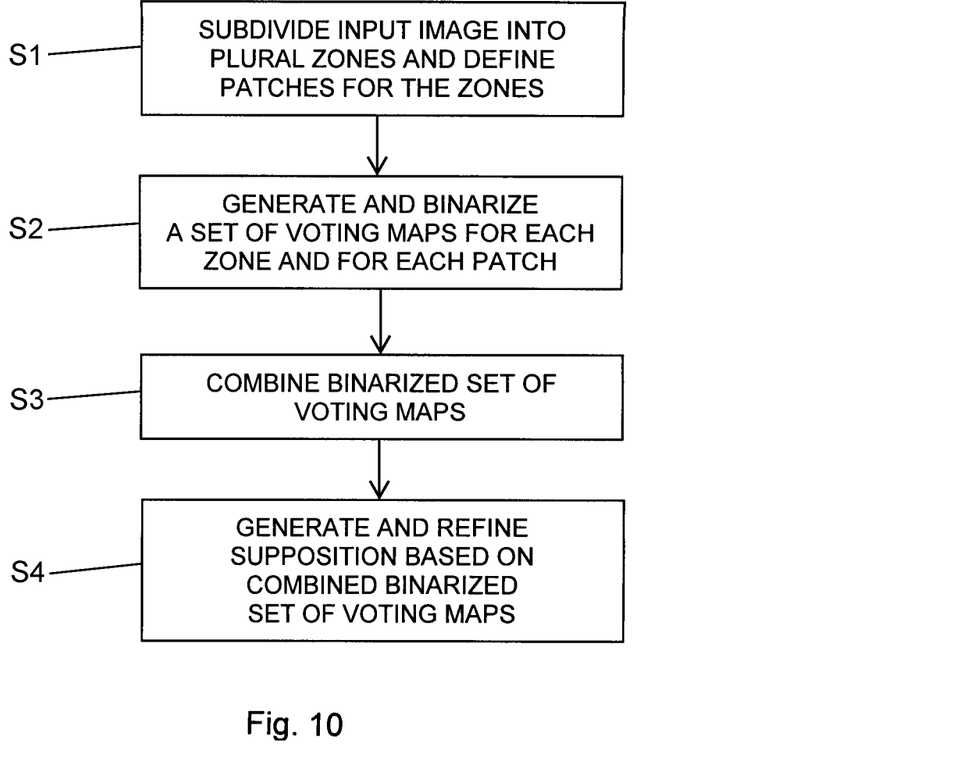
FIG. 10 shows another sketch of the method for object recognition according to an exemplary embodiment of the present invention.

FIG. 10 shows a schematic diagram of the method for object recognition according to an exemplary embodiment of the present invention.

The method for object recognition of an input image A for a vehicle, may comprise the following steps:

As a first step of the method, subdividing S1 the input image A into a plurality of zones $z^{(m)}$ and to define a plurality of patches $p_j^{(m)}$ for the zones $z^{(m)}$ may be performed.

As a second step of the method, providing S2 a set of voting maps $V^{(m)}$ for each zone m of the plurality of zones $z^{(m)}$ and for each patch $p_j$ of the plurality of patches $p_j^{(m)}$ and binarizing the generated set of voting maps $V^{(m)}$ may be performed.

As a third step of the method, combining S3 the binarized set of voting maps $V^{(m)}$ is conducted.

As a fourth step of the method, generating S4 a supposition out of or from the combined, binarized set of voting maps $V^{(m)}$ and refining the supposition out of or from the combined, binarized set of voting maps $V^{(m)}$ is conducted.

In other words, the present invention advantageously provides the generation of voting maps that lead directly to generic object region detection, thereby outperforming existing hypothesis generation based on the objectiveness measure.

The present invention advantageously provides voting map generation on motorway scenes using only color channels, while other features such as orientation and local distinctiveness are also applicable.

In other words, the present invention advantageously provides that hypotheses for object candidates in a motorway scene can be retrieved without using any prior knowledge about the situation given a certain degree of homogeneity within the scene.

This makes the method for object recognition feasible for increasing the detection rate of ADAS algorithms for distant object hypothesis on for example motorway scenes with high velocities. Any traffic sign, car or unknown object can be detected early. Subsequent classification stages can be applied on potential regions of interests only, while reducing the false positive rates dramatically.

In particular, object candidates which are not expected on roads such as dropped canoes, bikes, shoes, crates of beverages and so on can be found with our approach since no prior assumption concerning the objects are made.

Hence, the robustness of camera-based assistance functions such as ACC or TSR can hereby be increased. However, tiny objects are yet dismissed due to a suppression of outliers during the local clustering. This could be overcome by using a temporal filter and a probability value based on the distinctiveness of the pixel candidates.

Applied on motorway scenes, the approach shows promising results in generating hypotheses of automotive objects for ADAS algorithms. However, temporal filtering and incorporating prior knowledge such as road models can further increase the performance of our approach.

According to further exemplary embodiment, a segmentation of the plurality of patches $p_j^{(m)}$ for the zones $z^{(m)}$ may be conducted with the help of a patch classifier to dismiss false-positive object hypotheses detected in regions such as the sky or trees providing an improved set of voting maps $V^{(m)}$ for each zone m.

It has to be noted that embodiments of the present invention are described with reference to different subject-matters. In particular, some embodiments are described with reference to method type claims, whereas other embodiments are described with reference to the device type claims.

However, a person skilled in the art will gather from the above and the foregoing description that, unless otherwise notified, in addition to any combination of features belonging to one type of the subject-matter also any combination between features relating to different subject-matters is considered to be disclosed with this application.

However, all features can be combined providing synergetic effects that are more than the simple summation of these features.

While the invention has been illustrated and described in detail in the drawings and foregoing description, such illustration and description are to be considered illustrative or exemplary and not restrictive; the present invention is not limited to the disclosed embodiments.

Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfill the functions of several items recited in the claims.

The mere fact that certain measures are recited in mutually different dependent claims does not indicate that a combination of these measures cannot be used to advantage. Any reference signs in the claims should not be considered as limiting the scope.

The invention claimed is:

1. Device (100) for object recognition of an input image (A), the device (100) comprising:
   a patch selector (10), which is configured to subdivide the input image (A) into a plurality of zones $z^{(m)}$ and to define a plurality of patches $p_j^{(m)}$ for the zones $z^{(m)}$ and to provide the plurality of patches $p_j^{(m)}$ for the zones $z^{(m)}$ using inner statistics of each patch $p^{(m)}$ to classify a patch as belonging to a background region or to an object region;
   a voting maps generator (20), which is configured to generate a set of voting maps $V^{(m)}$ for each zone m of the plurality of zones $z^{(m)}$ and for each patch $p_j$ of the plurality of patches $p_j^{(m)}$ and which is configured to binarize the generated set of voting maps $V^{(m)}$;
   a voting maps combinator (30), which is configured to combine the binarized set of voting maps $V^{(m)}$; and
   a supposition generator (40), which is configured to generate a supposition out of or from the combined, binarized set of voting maps $V^{(m)}$ and to perform a refinement of the supposition out of or from the combined, binarized set of voting maps $V^{(m)}$.

2. The device according to claim 1, wherein the patch selector (10) is configured to model the inner statistics of each patch $p_j^{(m)}$ by a Gaussian distribution $P(p_j^{(m)})$ computed over the intensities T of all pixels within each patch $p_j^{(m)}$.

3. The device according to claim 1, wherein the patch selector (10) is configured to define the plurality of patches $p_j^{(m)}$ for the zones $z^{(m)}$ with a size of the patches in such a way that objects smaller than the patch are still detected within each zone m.

4. The device according to claim 1, wherein the voting maps generator (20) is configured to generate the set of voting maps $V^{(m)}$ comprising a map size corresponding to an image size of the input image (A).

5. The device according to claim 1, wherein the voting maps generator (20) is configured to generate the set of voting maps $V^{(m)}$ by computing i) a feature descriptor $I_j^{(m)}$ for each patch $p_j^{(m)}$ and/or ii) a descriptor d(x) for each pixel of the input image (A).

6. The device according to claim 1, wherein the voting maps generator (20) is configured to generate the set of voting maps $V^{(m)}$ by determining a feature descriptor $I_j^{(m)}$ in terms of computing a mean feature vector across all pixels of each patch $p_j^{(m)}$.

7. The device according to claim 1,
wherein the voting maps generator (20) is configured to determine which pixels belong to the same background region as the patch $p_j^{(m)}$ by a thresholding on the voting map; and/or
wherein the voting maps generator (20) is configured to assign pixels with a high similarity in comparison to the rest of the pixels as belonging to the same background region as the patch $p_j^{(m)}$.

8. The device according to claim 1, wherein the voting maps combinator (30) is configured to identify all pixels that are unvoted to a background patch.

9. A method for object recognition of an input image (A), the method comprising the following steps of:
Subdividing (S1) the input image (A) into a plurality of zones $z^{(m)}$ and defining a plurality of patches $p_j^{(m)}$ for the zones $z^{(m)}$; and providing the plurality of patches $p_j^{(m)}$ for the zones $z^{(m)}$ using inner statistics of each patch $p^{(m)}$ to classify a patch as belonging to a background region or to an object region;
Generating (S2) a set of voting maps $V^{(m)}$ for each zone m of the plurality of zones $z^{(m)}$ and for each patch $p_j$ of the plurality of patches $p_j^{(m)}$ and binarizing the generated set of voting maps $V^{(m)}$;
Combining (S3) the binarized set of voting maps $V^{(m)}$; and
Generating (S4) a supposition out of or from the combined, binarized set of voting maps $V^{(m)}$ and refining the supposition out of or from the combined, binarized set of voting maps $V^{(m)}$.

* * * * *

UNITED STATES PATENT AND TRADEMARK OFFICE
CERTIFICATE OF CORRECTION

PATENT NO.         : 10,824,881 B2
APPLICATION NO.    : 16/312634
DATED              : November 3, 2020
INVENTOR(S)        : Ann-Katrin Fattal et al.

It is certified that error appears in the above-identified patent and that said Letters Patent is hereby corrected as shown below:

In the Specification

Column 7,
Line 36, after "maps", replace "$V^{(m)}$" with --$V_j^{(m)}$--;

Column 8,
Line 36, replace the entire line to read:
-- $V_f = \sum_{m=1}^{n} V^{(m)} \quad (6)$ --;

Column 10,
Line 61, before "The voting maps", insert a paragraph break;

In the Claims

Column 12,
Claim 2, Line 59, after "intensities", replace "T" with --I--.

Signed and Sealed this
First Day of June, 2021

Drew Hirshfeld
*Performing the Functions and Duties of the
Under Secretary of Commerce for Intellectual Property and
Director of the United States Patent and Trademark Office*